US006061364A

United States Patent [19]
Hager et al.

[11] Patent Number: 6,061,364
[45] Date of Patent: May 9, 2000

[54] SYSTEM AND METHOD FOR TRANSPORTING SS7 SIGNALING OVER BROADBAND ASYNCHRONOUS TRANSFER MODE LINKS

[75] Inventors: Kevin W. Hager, Flower Mound; Frederick L. Ross, Austin, both of Tex.

[73] Assignee: Alcatel USA Sourcing, L.P., Plano, Tex.

[21] Appl. No.: 08/992,373

[22] Filed: Dec. 16, 1997

[51] Int. Cl.[7] .................................................. H04J 3/12
[52] U.S. Cl. ............................................ 370/467; 370/522
[58] Field of Search .................................. 370/395, 467, 370/522

[56] References Cited

U.S. PATENT DOCUMENTS

| 5,315,641 | 5/1994 | Montgomery et al. | 379/94 |
| 5,535,200 | 7/1996 | Gardner | 370/60 |
| 5,539,884 | 7/1996 | Robrock, II | 395/200.12 |
| 5,541,917 | 7/1996 | Farris | 370/60.1 |
| 5,940,393 | 8/1999 | Duree et al. | 370/392 |

FOREIGN PATENT DOCUMENTS

| 0669748 | 8/1995 | European Pat. Off. | H04M 3/42 |
| 9728622 | 8/1997 | WIPO | H04J 3/12 |

OTHER PUBLICATIONS

T. Mukasa et al., "Proposals of Call Modeling for Intelligent Network Over Broadband ISDN", IEEE 1995, pp. 1265–1271.
Cheng, F.–C., et al., "Wireless Intelligent ATM Network and Protocol Design for Future Personal Communication Systems", IEEE 1997, pp. 1289–1307.
Huélamo, J., "Multimedia Control Stations for ATM Broadband Networks Providing Multimedia Intelligent Network Services", IEEE 1993, 650–655.
Jeff Lawrence, "Signaling protocol ushers in intelligent nets," *Electronic Engineering Times*, Jun. 17, 1996.

Primary Examiner—Melvin Marcelo
Attorney, Agent, or Firm—Baker Botts L.L.P.

[57] ABSTRACT

A high speed signaling network includes a high speed transport virtual circuit network, and a plurality of advanced intelligent network nodes coupled to the high speed transport virtual circuit network via a plurality of high speed links transporting signaling data.

17 Claims, 4 Drawing Sheets

6,061,364

SYSTEM AND METHOD FOR TRANSPORTING SS7 SIGNALING OVER BROADBAND ASYNCHRONOUS TRANSFER MODE LINKS

TECHNICAL FIELD OF THE INVENTION

This invention is related in general to the field of telecommunications systems. More particularly, the invention is related to a system and method for transporting SS7 signaling over broadband asynchronous transfer mode links.

BACKGROUND OF THE INVENTION

As telecommunication networks approach the next century, the ever increasing demand for new services and applications require a rapid expansion of the intelligent signaling and switching networks. In the intelligent network (IN) or advanced intelligent network (AIN), Signaling System Number 7 (SS7) is the signaling protocol for the telecommunications network which is transmitted over 56 or 64 Kbps data links. The SS7 links interconnect signal transfer points (STP), service switching points (SSP), and service control points (SCP) in the typical intelligent network architecture.

The increasing traffic volume of the telecommunications network coupled with new intelligent service offerings result in a bulky SS7 network which may become a troublesome bottleneck that can negatively impact the network's ability to route calls and provide services. New services, such as local number portability, require a per-call query and response with a network database. These new services are likely to drive current data links to full capacity and introduce additional call set-up delays using the lower speed data links used in today's network. The need for decreasing signaling latency will be of critical importance as end users perceive the quality of service from their chosen carrier.

The signal transfer point performs the message transfer protocol (MTP) routing, management functions for the SS7 user layers and the SCCP (signaling connection control part) functions. The signal transfer points are typically arranged in pairs to provide signaling redundancy for service switching points and for service control points in a typical SS7 network architecture. The SS7 network is integral to call control functions.

SUMMARY OF THE INVENTION

Accordingly, a need has arisen for a solution to the congestion problem that may arise with the SS7 networks. The teachings of the present invention provides a system and method for transporting SS7 over broadband asynchronous transfer mode links.

In one aspect of the invention, a high speed signaling network includes a high speed transport virtual circuit network, and a plurality of advanced intelligent network nodes are coupled to the high speed transport virtual circuit network via a plurality of high speed links transporting signaling data.

BRIEF DESCRIPTION OF THE DRAWINGS

For a better understanding of the present invention, reference may be made to the accompanying drawings, in which.

DETAILED DESCRIPTION OF THE INVENTION

Figure 1:
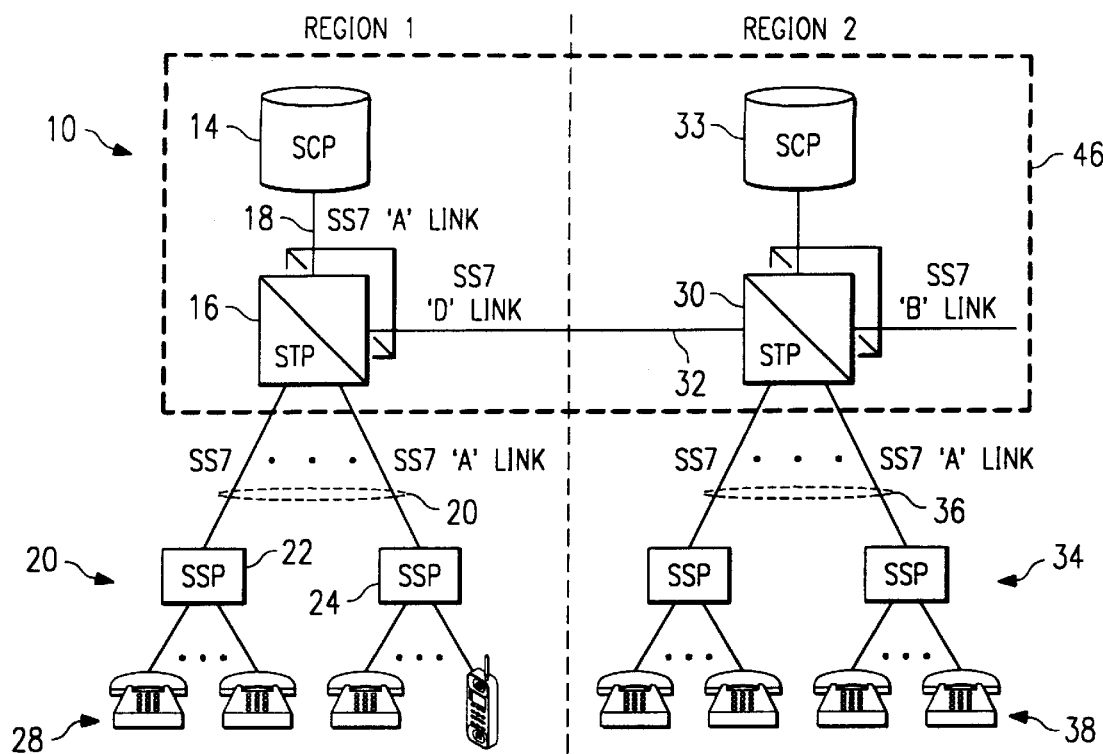
FIG. 1 is a simplified block diagram of an exemplary advanced intelligent network.

The preferred embodiments of the present invention are illustrated in FIGS. 1–9, like reference numerals being used to refer to like and corresponding parts of the various drawings.

FIG. 1 shows an exemplary telecommunications network 10 such as an advanced intelligent network (AIN) or intelligent network (IN). Network 10 includes a service control point (SCP) 14 and a mated pair of signal transfer points (STPs) 16, which are coupled to one another with SS7 'B' type signaling links. Service control point 14 is directly linked to signal transfer point 106 via an SS7 (signaling system number 7) 'A' type signaling link set 18. An SS7 link set may include up to sixteen signaling data links. Signal transfer points 16 are further coupled to one or more service switching points (SSPs) 22 and 24, via SS7 link sets 20 consisting of 'A' links. Service switching points perform the switching and call handling functions in the network.

Service control point 14 is a transaction based processing system whose primary responsibility is to respond to queries from service switching points 22 for data needed to complete routing a call. Service switching points 22 are part of the public switched telephone network and are coupled to the customer premises equipment (CPE) 28 of telephone service subscribers. Signal transfer points 16 may be coupled to at least one other mated pair signal transfer points 30 via an SS7 link set 32 comprising 'D' type signaling links. Signal transfer points 30 is also coupled to a service control point 33 via 'A' type links and to service switching points 34 via SS7 'A' type link sets 36. A plurality of customer premises equipment 38 are coupled to service switching points 34.

It may be seen that certain SS7 link sets may become points of congestion in the SS7 network 46. For example, SS7 link set 18 between service control point 14 and signal transfer point 16 may be a bottleneck for transporting database queries originating from multiple central offices. As such, the capacity of SS7 link set 18 may severely restrict the service control point's ability to service large volumes of calls. With the offering of new services, often multiple database queries transmitted on links in SS7 network 46 are required to complete a call. For example, service control point 14 provides a centralized database for many services, which includes a local number portability (LNP) database, a line information database (LIDB), and a calling name (CNAM) database; and signal transfer point 16 may include global title translation (GTT) databases such as an LNP GTT, an LIDB GTT, switch based services GTT, CNAM GTT, local number portability databases and interswitch voice messaging (ISVM) GTT databases containing routing data related to each service.

Similarly, SS7 signaling link set 32 coupling mated pair signal transfer points 16 and 30 may become congested as queries between service control points 14 and 33 are consumed by queries between regions or across network boundaries.

Figure 2:
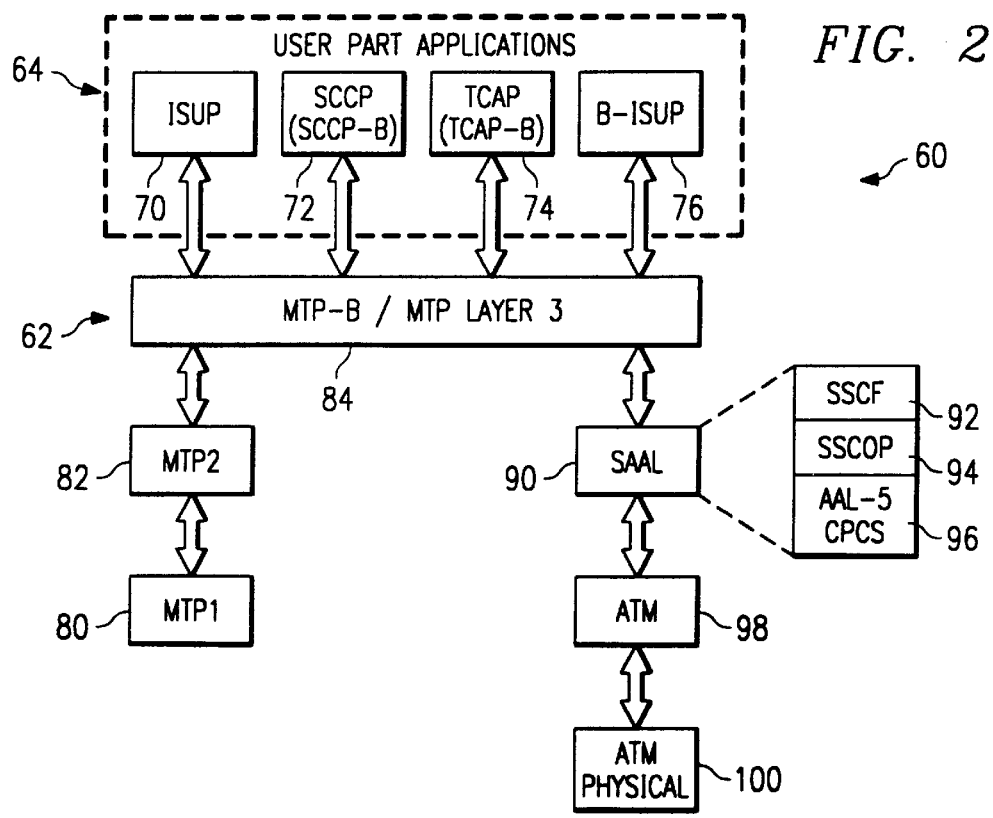
FIG. 2 is diagram of the broadband SS7 layered architecture with the asynchronous transfer mode layer.

FIG. 2 is a block diagram showing a combined narrowband and broadband SS7 architecture 60 which provides SS7 interworking functions between narrowband SS7 and broadband SS7. As in the SS7 protocol, broadband SS7 architecture also includes two parts, a message transfer part (MTP) 62 and user parts 64. Message transfer part 62 contains the necessary mechanism to ensure reliable transmission of functional signaling messages with maximum network availability. User parts 64 provide criteria for application and service management. User parts 64 may include ISDN (integrated services digital network) user part (ISUP) 70, narrowband and broadband SCCP 72, TCAP (transaction capabilities application part) (narrowband and broadband) 74, and broadband ISDN user part 76. One of the primary characteristics of broadband SS7 messages is the longer message size—4096 bytes versus 274 bytes. SCCP 72 and TCAP 74 each contain broadband extensions for compatibility with the broadband message size. B-ISUP 76 differs from ISUP 70 by supporting specific messages and parameters for broadband services as specified by ITU industry standards (Q.2764). Message transfer part 62 of SS7 includes three levels: message transfer part layer 1 80, message transfer part layer 2 82, and message transfer part layer 3 84. Similarly, message transfer part layer 3 also contains broadband extensions to support broadband services. In broadband SS7 architecture 60, provisions are made for transmitting SS7 signaling over broadband links (OC-3 or STM-1) operating at 155 Mbits/second. This is achieved by replacing SS7 message transfer part layers 2 and 1 with SAAL (signaling ATM adaptation layer) 90, which includes asynchronous transfer mode (ATM) SSCF (service specific coordination function) 92, SSCOP (service specific connection oriented protocol) 94, and ATM adaptation layer 96 (AAL) functionalities. SSCOP is a connection oriented protocol with error recovery providing a generic data transfer service for different ATM adaptation layer services defined by the SSCF. The primary function of the SSCF is to map the services of the SSCOP to the requirements of MTP layer 3. Message transfer part layer 1 80 is replaced by an asynchronous transfer mode layer 98 and an asynchronous transfer mode physical medium dependent layer 100. Message transfer part layer 1 80 includes an interface to V.35/RS-449 narrowband link, and asynchronous transfer mode physical layer 100 includes an interface to a broadband OC-3 or STM-1 link.

Figure 3:
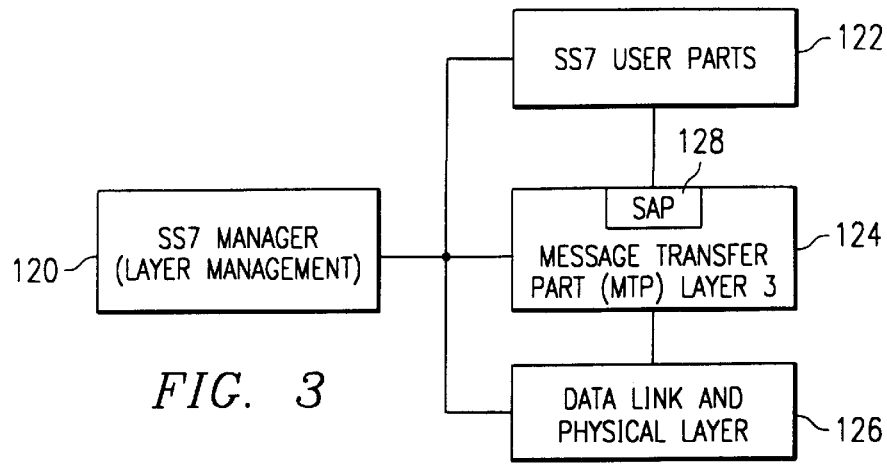
FIG. 3 is a simplified block diagram of major broadband SS7 functional processes in the broadband SS7 platform.
Figure 4:
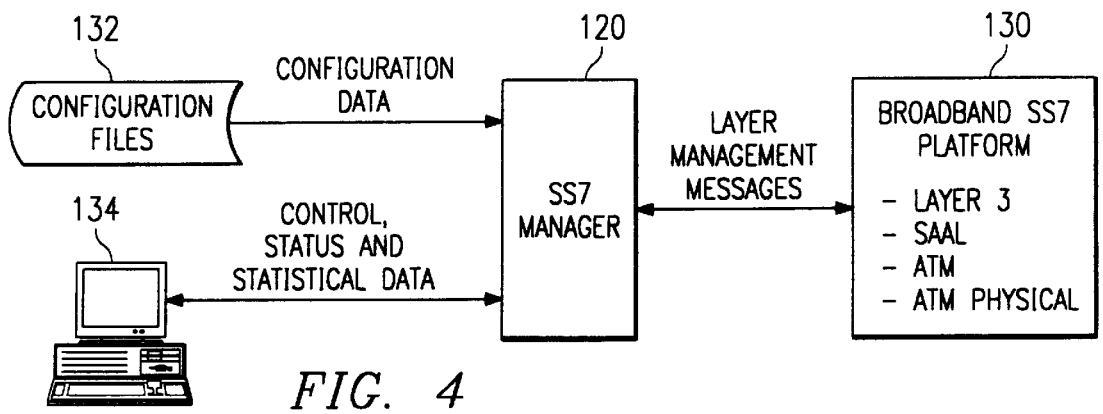
FIG. 4 is a simplified functional block diagram of the broadband SS7 platform.

Referring to FIG. 3, the major functional processes of broadband SS7 protocol implementation include an SS7 platform manager 120, an SS7 user parts process 122, a message transfer part layer 3 process 124, and a data link and physical layer process 126. SS7 user parts 122 accesses message transfer part layer 3 124 via a service access point (SAP) 128. SS7 platform manager 120, also shown in FIG. 4, is responsible for the configuration and monitoring of a broadband SS7 platform 130 as well as inter-process communications. SS7 platform manager 120 configures the system from configuration files 132, which are read upon start-up of broadband SS7 platform 130. Configuration files 132 may be modified without interrupting SS7 traffic. A user interface 134 may also be provided to SS7 platform manager 120 for interactive access to broadband SS7 platform 130. User interface 134 provides access to the control, statistics and status interfaces for SS7 user parts processes 122, message transfer part layer 3 process 124, and the broadband signaling link components. The SS7 platform manager 120 provides layer management to all the components within the architecture via a layer management messaging protocol.

SS7 user parts process 122 implements the services and applications which broadband SS7 platform 130 supports, which may include ISDN user part, SCCP, TCAP, and broadband ISDN user part. ISDN user part and B-ISDN user part require a service access point layer on a session-by-session basis (see FIGS. 6 and 7) SCCP process 140 provides additional functions to the message transfer part layer 3 124 to support connection-less and connection-oriented network services. SCCP process 140 also supports a logical addressing capability among database and intelligent network applications using SS7 network 46 (FIG. 1). SCCP process 140 acts as a network service provider and provides network subsystem routing for user layers 154, including TCAP 150. SS7 platform manager 120 has configuration and management access to SCCP process 140 layer.

Figure 5:
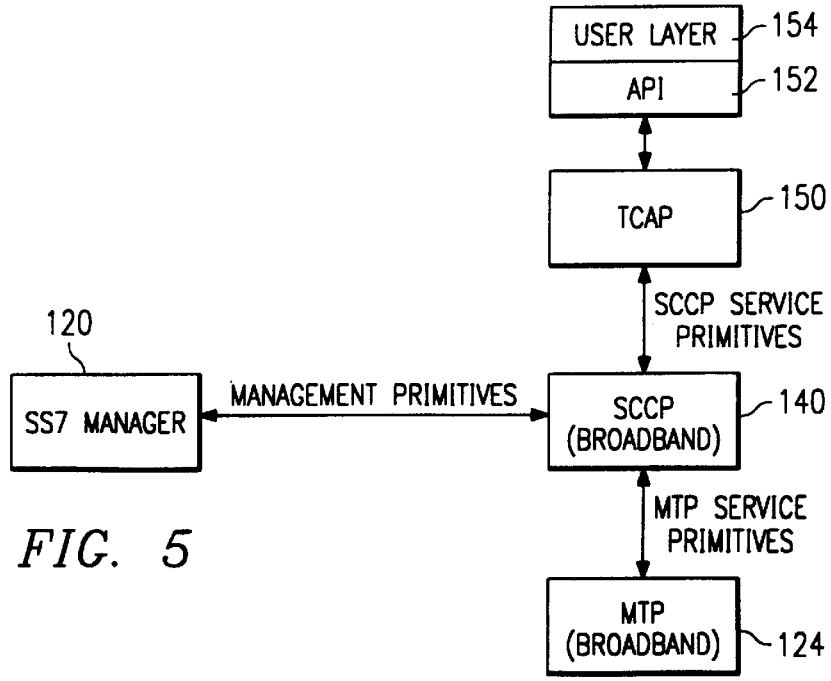
FIG. 5 is a simplified block diagram of an embodiment of a signaling connection control part process of the SS7 user parts.

The SS7 user parts process also includes a TCAP process 150 depicted in FIG. 5, which provides a way for intelligent applications to communicate across SS7 network 46 from one application processing platform to a destination application. TCAP process 150 which interfaces with SCCP process 140, may include a programmable application program interface (API) library 152 to enable user applications 154 access to TCAP services.

Figure 6:
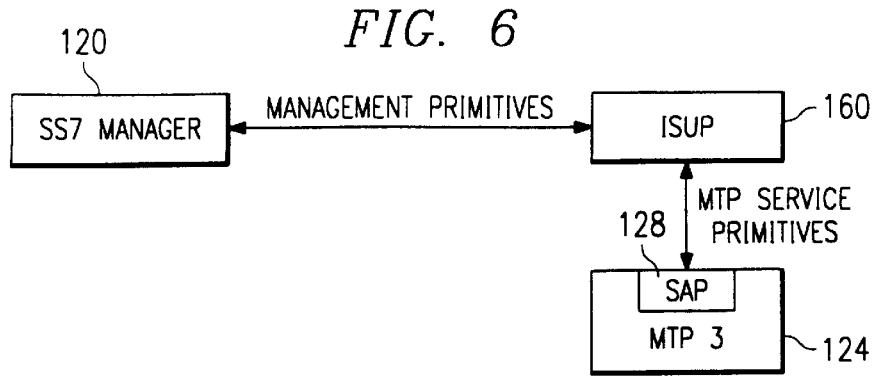
FIG. 6 is a simplified block diagram of an embodiment of an ISDN user part process of the SS7 user parts.

SS7 user parts 122 may also include an ISDN user part process 160, shown in FIG. 6. The ISDN user part is a protocol for circuit related messages and is used to set up and tear down all circuits used for data or voice calls in the public switched telephone network. ISDN user part process 160 may interact directly with the message transfer part process 124 instead of using the services of the SCCP. User of SCCP for ISDN user part 160 is for further study.

Figure 7:
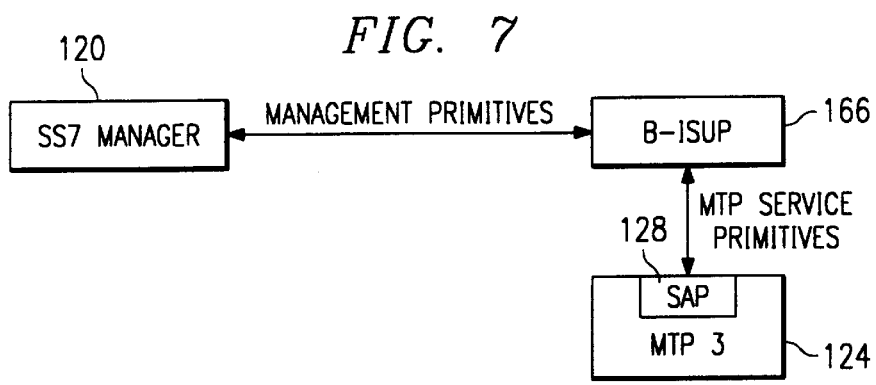
FIG. 7 is a simplified block diagram of an embodiment of a broadband ISDN user part process of the SS7 user parts.

Referring to FIG. 7, a broadband ISDN user part (B-ISUP) process 166 supports broadband ISDN user part through SS7 network 46. Broadband ISDN user part process 166 interfaces with message transfer part process 124 with message transfer part service primitives instead of using the services of SCCP.

Figure 8:
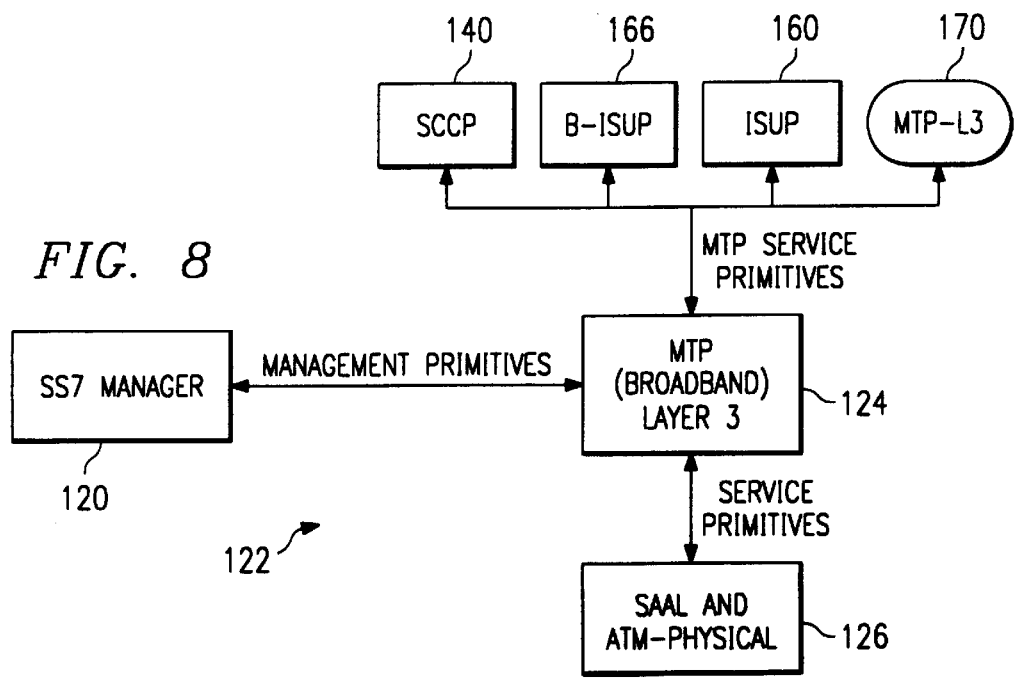
FIG. 8 is a simplified block diagram of an embodiment of a message transfer part process.
Figure 9:
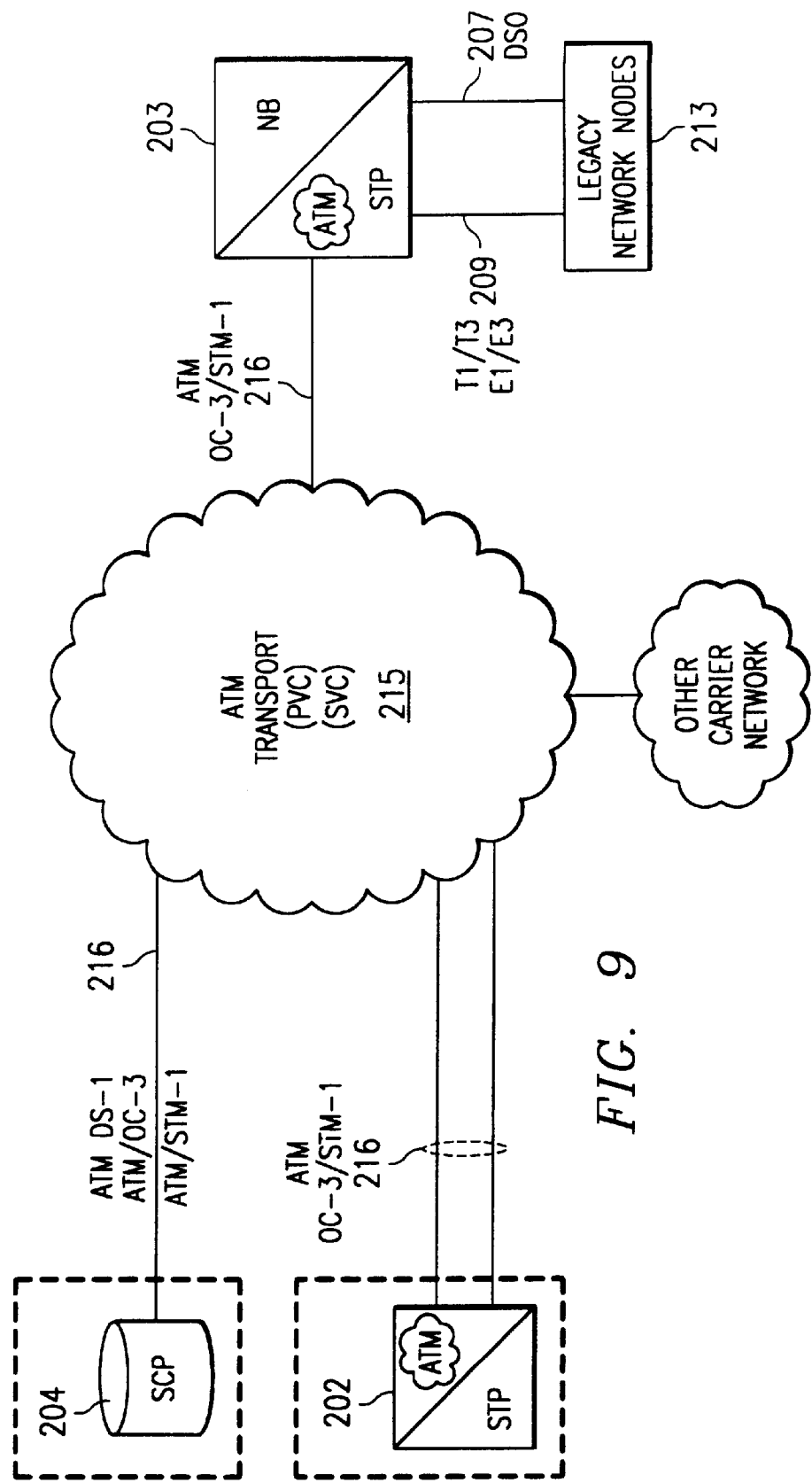
FIG. 9 is a simplified block diagram of an embodiment of a high speed signaling network.

Referring to FIG. 8, message transfer part layer 3 process 124 implements the message routing, message distribution and message discrimination part of the broadband SS7 platform. Message processing begins in message transfer part layer 3 124. Message transfer part layer 3 124 relies on the services of data link and physical layer 126 for delivery of all messages. The interface between the two layers consists of a set of primitives. Message transfer part layer 3 124 also uses primitives to communicate with SS7 user parts 122, i.e., SCCP 140, ISUP 162, and B-ISUP 166. A service access point 128 is established for each session between B-ISUP 166 and message transfer part layer 3 124 and also between ISUP 160 and message transfer part layer 3 124 (shown in FIGS. 6 and 7). A message transfer part layer 3 API library 170 may be provided for applications who wish to directly access the message transfer part service primitives.

Data link and physical layer process 126 provides the message transfer part layer 3 process 124 with either a narrowband or broadband signaling link. The narrowband signaling link configuration is provided through SS7 message transfer part layers 1 and 2. The broadband signaling link configuration may be provided through SAAL which provides SSCOP and SSCF functionality. Data link and physical layer 126 delivers the message transfer part layer 3 messages. In a narrowband SS7 implementation, message transfer part layer 3 interfaces with a message transfer part layer 2 82 (FIG. 2). To support the SS7 signaling over an asynchronous transfer mode link the message transfer part layer 3 interfaces with a SAAL (signaling asynchronous transfer mode adaptation layer) 90. However, message transfer part layer 3 accesses the asynchronous transfer mode layer 2 functionality with the same set of primitives as those used to interface with message transfer part layer 2. Data link and physical layer 126 may have three possible configurations in broadband SS7 platform depending on whether it supports narrowband, broadband signaling links, or both. Broadband SS7 platform 130 provides narrowband signaling links by integrating message transfer part layer 3 with an message transfer part layer 2 and 1 and ultimately a physical link supporting V.35, RS-449 or DSOA (data service operations and administration interface protocol) physical interfaces. Broadband signaling links may be provided by integrating the message transfer part layer 3 with SAAL 90 to the OC-3 link. SAAL 90 functionality is provided by SSCF and SSCOP.

SS7 message signaling units (MSUs) are assembled into standard asynchronous transfer mode packets which includes physical data units (PDUs). The transmission facility includes virtual channels that provide an end-to-end virtual path which may be a permanent virtual circuit (PVC) and/or a switched virtual circuit (SVC). However, the characteristics of SS7 ISUP and SS7 TCAP traffic suggest that when a data link is established, aligned and becomes operational, it generally remains in this state for an extended period of time. Therefore, it is more likely that permanent virtual circuits will be used in network 215 rather than switched virtual circuits though it is a matter of operator choice. The virtual path connection is defined based on the interpretation of the higher layer SS7 message transfer protocol (MTP-3) that includes a destination point code which identifies the physical location of the termination point of the signaling path. Within the virtual path the facility is allocated into multiple virtual channels. The signaling bandwidth of the virtual channel is limited only by the size of the medium or total bandwidth of the physical facility established by industry standards. In this scheme, the broadband asynchronous transfer mode transport does not use point-to-point physical connections, but virtual circuits, whether they may be switched or permanent. This is different from network topologies contemplated by other entities, such as Bellcore. Bellcore has promulgated the *Generic Requirements for CCS Nodes Supporting ATM High-Speed Signaling Links* (*HSLS*), GR-2878-CORE, November 1995, which is incorporated herein by reference.

Service control point 204 may be coupled to network 215 by an electrical facility (DS-1 or E1) or an optical facility (OC-3 or STM-1) link set 216 using asynchronous transfer mode signaling to transport SS7. Signal transfer points 202 are coupled to network 215 by optical link sets 216 which may transport asynchronous transfer mode OC-3 or STM-1 format signals. Signal transfer point 203 may also provide physical connectivity for electrical DS-0 (single channel) based SS7 signaling data links 207 and electrical channelized and fractional T1/E1/T3/E3 SS7 signaling data links over a singular transmission facility 209 to legacy network nodes 213, as well as optical SS7 signaling OC-3/STM-1 data links 216 to asynchronous transfer mode network 215. In this manner, signal transfer point 203 supports signaling for both circuit-based and packet-based connectivities. As specified by industry standards, the link sets in the asynchronous transfer mode SS7 network may have up to 16 links, and load balancing between the 16 links in a link set may be performed with known techniques in the art. Further, any link within a link set may be dynamically loaded with the total capacity of the facility bandwidth to any level of occupancy of the virtual channel so long as the total facility bandwidth has not been exceeded by the total usage of all available channels.

Although the present invention and its advantages have been described in detail, it should be understood that various mutations, changes, substitutions and alterations can be made therein without departing from the spirit and scope of the invention as defined by the appended claims.

What is claimed is:

1. A high speed signaling network, comprising:
    a high speed transport virtual circuit network; and
    a plurality of advanced intelligent network nodes coupled to the high speed transport virtual circuit network via a plurality of high speed links transporting signaling data and bearer data, each of the plurality of advanced intelligent network nodes operable to interwork between narrowband and broadband signaling protocols.

2. The high speed signaling network, as set forth in claim 1, wherein the high speed transport virtual circuit network comprises permanent virtual circuits.

3. The high speed signaling network, as set forth in claim 1, wherein the high speed transport virtual circuit network comprises switched virtual circuits.

4. The high speed signaling network, as set forth in claim 1, wherein the plurality of high speed links coupling the advanced intelligent network nodes to the high speed transport virtual circuit network comprises at least one link and no more than 16 links within a single link set.

5. The high speed signaling network, as set forth in claim 1, wherein the plurality of high speed links comprise asynchronous transfer mode multi-channel transmission facilities.

6. The high speed signaling network, as set forth in claim 1, wherein the plurality of advanced intelligent network nodes comprise a service control point.

7. The high speed signaling network, as set forth in claim 1, wherein the plurality of advanced intelligent network nodes comprises a signal transfer point.

8. A high speed signaling network, comprising:
    a high speed transport virtual circuit network; and
    a plurality of advanced intelligent network nodes coupled to the high speed transport virtual circuit network via a plurality of high speed links transporting signaling data and bearer data, wherein the plurality of high speed links comprise asynchronous transfer mode transmission facilities carrying SS7 signaling data links.

9. The high speed signaling network, as set forth in claim 8, wherein the plurality of high speed links comprise electrical-based asynchronous transfer mode transmission facilities carrying SS7 signaling data links.

10. A method for transporting signaling data over high speed data links, comprising the steps of:
    coupling network nodes to a high speed virtual circuit network with high speed SS7 data link sets;
    coupling each network node to the high speed virtual circuit network with a redundant high speed SS7 data link set;
    load balancing among the data links within each high speed SS7 data link set; and interworking between narrowband signaling and broadband signaling.

11. The method, as set forth in claim 10, further comprising the step of converting DS-0 circuit-based SS7 signaling data to packet-based asynchronous transfer mode signaling data.

12. The method, as set forth in claim 10, further comprising the step of converting electrical circuit-based SS7 signaling data to optical packet-based asynchronous transfer mode signaling data.

13. The method, as set forth in claim 10, further comprising the step of converting electrical circuit-based SS7 signaling data to electrical packet-based asynchronous transfer mode signaling data.

14. A method for transporting signaling data over high speed data links, comprising the steps of:

coupling network nodes to a high speed virtual circuit network with high speed SS7 data link sets;

coupling each network node to the high speed virtual circuit network with a redundant high speed SS7 data link set;

load balancing among the data links within each high speed SS7 data link set; and converting circuit-based SS7 signaling data into packet-based asynchronous transfer mode packets.

15. The method, as set forth in claim 14, wherein the circuit based SS7 signaling data is in DS-0 signals.

16. The method, as set forth in claim 14, wherein the circuit based SS7 signaling data is in electrical signals and the packet based asynchronous transfer mode packet data are in optical signals.

17. The method, as set forth in claim 14, wherein the circuit based SS7 signaling data is in electrical signals and the packet based asynchronous transfer mode packets are in electrical signals.

* * * * *